(12) United States Patent
Sarkar et al.

(10) Patent No.: US 7,360,697 B1
(45) Date of Patent: Apr. 22, 2008

(54) METHODS AND SYSTEMS FOR MAKING PRICING DECISIONS IN A PRICE MANAGEMENT SYSTEM

(75) Inventors: Manojit Sarkar, Fremont, CA (US); Simon C. Lee, Castro Valley, CA (US); Niel C. Esary, Mountain View, CA (US); Hannes L. Marais, Mountain View, CA (US)

(73) Assignee: Vendavo, Inc., Palo Alto, CA (US)

( * ) Notice: Subject to any disclaimer, the term of this patent is extended or adjusted under 35 U.S.C. 154(b) by 381 days.

(21) Appl. No.: 10/993,412

(22) Filed: Nov. 18, 2004
(Under 37 CFR 1.47)

(51) Int. Cl.
*G06K 15/00* (2006.01)

(52) U.S. Cl. .............................. 235/383; 705/7; 705/10; 705/400

(58) Field of Classification Search ................ 235/383; 705/1, 20, 400, 7, 10, 30
See application file for complete search history.

(56) References Cited

U.S. PATENT DOCUMENTS

| 3,806,711 | A | 4/1974 | Cousins, Jr. |
| 5,053,957 | A | 10/1991 | Suzuki |
| 5,224,034 | A | 6/1993 | Katz et al. |
| 5,461,708 | A | 10/1995 | Kahn |
| 5,670,984 | A | 9/1997 | Robertson et al. |
| 5,689,287 | A | 11/1997 | Mackinlay et al. |
| 5,740,448 | A | 4/1998 | Gentry et al. |
| 5,878,400 | A | 3/1999 | Carter, III |
| 6,320,586 | B1 | 11/2001 | Plattner et al. |
| 6,812,926 | B1 | 11/2004 | Rugge |
| 6,856,967 | B1 * | 2/2005 | Woolston et al. ............. 705/26 |
| 2002/0116348 | A1 * | 8/2002 | Phillips et al. .............. 705/400 |
| 2003/0126053 | A1 * | 7/2003 | Boswell et al. ............... 705/36 |
| 2003/0191723 | A1 * | 10/2003 | Foretich et al. ............. 705/400 |
| 2003/0195810 | A1 | 10/2003 | Raghupathy et al. |
| 2003/0200185 | A1 | 10/2003 | Huerta et al. |
| 2003/0225593 | A1 * | 12/2003 | Ternoey et al. ................ 705/1 |
| 2003/0229552 | A1 * | 12/2003 | Lebaric et al. ............... 705/35 |
| 2004/0024715 | A1 * | 2/2004 | Ouimet ....................... 705/400 |
| 2005/0004819 | A1 * | 1/2005 | Etzioni et al. ................. 705/5 |

FOREIGN PATENT DOCUMENTS

WO    WO99/60486    11/1999

OTHER PUBLICATIONS

Origin 7.0 Help (including 21 sheets of screen shots), 2000.
Microsoft Excel 2000, 1985-1999.
Marn, Michael V. and Robert L. Rosiello, "Managing Price, Gaining Profit," Harvard Business Review, pp. 84-93 (Sep.-Oct. 1992).

* cited by examiner

*Primary Examiner*—Daniel Hess
(74) *Attorney, Agent, or Firm*—Kang Lim

(57) ABSTRACT

Pricing decisions and policies in a price management system are made based on a unified database populated with correlated commitment data and transaction data. A historical database is populated with commitment data and transaction data. Each transaction data is then correlated with a commitment data. The resulting correlated data is then analyzed to make pricing decisions and policies.

11 Claims, 8 Drawing Sheets

METHODS AND SYSTEMS FOR MAKING PRICING DECISIONS IN A PRICE MANAGEMENT SYSTEM

BACKGROUND OF THE INVENTION

At least one primary goal of process pricing modeling is to construct models to capture objective data in order to analyze historical price behavior and current pricing portfolio, to create policies responsive to the analysis, and to predict and influence future price behavior. Systems like, for example SAP, attempt to manage and control business processes using objective data in order to gain enterprise efficiencies. By manipulating objective data, these systems offer consistent metrics upon which businesses may make informed decisions and policies regarding the viability and direction of their products and services. However, in many cases, the decisions and policies may be difficult to procure as a result of the volume and organization of relevant data and may be difficult to implement as both temporal restraints and approval processes may inhibit rapid deployment of valuable information.

For example, FIG. 1 is a simplified graphical representation of an enterprise pricing environment. Several example databases (104-120) are illustrated to represent the various sources of working data. These might include, for example, Trade Promotion Management (TPM) 104, Accounts Receivable (AR) 108, Price Master (PM) 112, Inventory Database 116, and Sales Database 120. The data in those repositories may be utilized on an ad hoc basis by Customer Relationship Management (CRM) 124, and Enterprise Resource Planning (ERP) 128 entities to produce pre and post sales transactions. The various connections 184 established between the repositories and the entities may supply information such as price lists as well as gather information such as invoices, rebates, etc.

The wealth of information contained in the various databases (104-120) however, is not "readable" by executive committees 140 due in part to accessibility and in part to volume. That is, even though the data in the various repositories may be related through a Relational Database management System (RDMS), the task of gathering data from disparate sources can be complex or impossible depending on the organization and integration of legacy systems upon which these systems may be created. In one instance, all of the various sources may be linked to a Data Warehouse 132 by various connections 144. Typically, the data from the various sources is simply aggregated to reduce it to a manageable or human comprehensive size. Thus, price lists may contain average prices over some selected temporal interval. In this manner, the data may be reduced. However, with data reduction, individual transactions may be lost. Additionally, the data from the various sources are different slices of pricing information in the time continuum or life cycle (i.e. commitment/forecast/projection vs. actual transactions). As a result, there is typically no integration or correlation between data from the various databases. For example, there is no correlation between sales data (e.g. projected/forecasted sales orders by specific customers for specific products) and the actual orders placed by customers against those sales orders for the specific products.

Analysts 136, on the other hand, may benefit from an aggregated data that unifies the pricing data across the time dimension from a data warehouse. Thus, an analyst 136 may compare average pricing across several regions within a desired temporal interval and then condense that analysis into a report to an executive committee. An executive committee may then, in turn, develop policies directed toward price structuring based on the analysis returned from an analyst 136. Those policies may then be returned to CRM 124 and ERP 128 entities to guide pricing activities via some communication channel 152 as determined by a particular enterprise.

As can be appreciated, a number of complexities may adversely affect this type of management process. First temporal setbacks exist at every step of the process. For example, a CRM 124 may make a sale. That sale may be entered into a Sales database 120, an Inventory database 116 and an AR database 108. The entry of that data may be automatic where sales occur at a network computer terminal, or may be entered in a weekly batch process. Anther example of a temporal setback is the time-lag introduced by batch processing data stored to a data warehouse resulting in weeks-old data that may or may not be timely for real-time decision support. A second setback is the lack of correlation between individual data from the various repositories. For example, sales projections generated by commitments from sales have not been correlated with the actual transactions or orders placed by customers. Consequently, pricing policies set by the executive committee 140 as well as proposals made by sales personnel have not been based on "accurate" business intelligence. As such, methods of correlating commitment data and transaction data into a unified database and making pricing decisions based thereupon may be desirable.

In view of the foregoing, methods of making pricing decisions in a price management system are disclosed.

SUMMARY OF THE INVENTION

To achieve the foregoing and in accordance with the present invention, a method of making a pricing decision based in a price management system is disclosed.

In one embodiment, a system for making a pricing decision in a price management system is presented. The system includes a database populated with commitment/forecast/projection data and actual transaction data, a correlation module for correlating the commitment data with the transaction data, a loader module for loading the correlated data and a unified database that unifies the different slices of pricing information from various sources in the time continuum or life cycle and a display module for displaying the records from unified database.

In another embodiment, a method for making a pricing decision in a price management system is presented. The method comprises populating a first database with commitment data and transaction data, correlating the transaction data with the commitment data, loading the correlated data into a unified database and analyzing the unified database to make a pricing decision or policy.

In still other embodiments, a computer program product in a computer readable media for making a pricing decision in a price management system is presented.

Note that the various features of the present invention, including the methods, systems, and computer program products disclosed herein can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1:
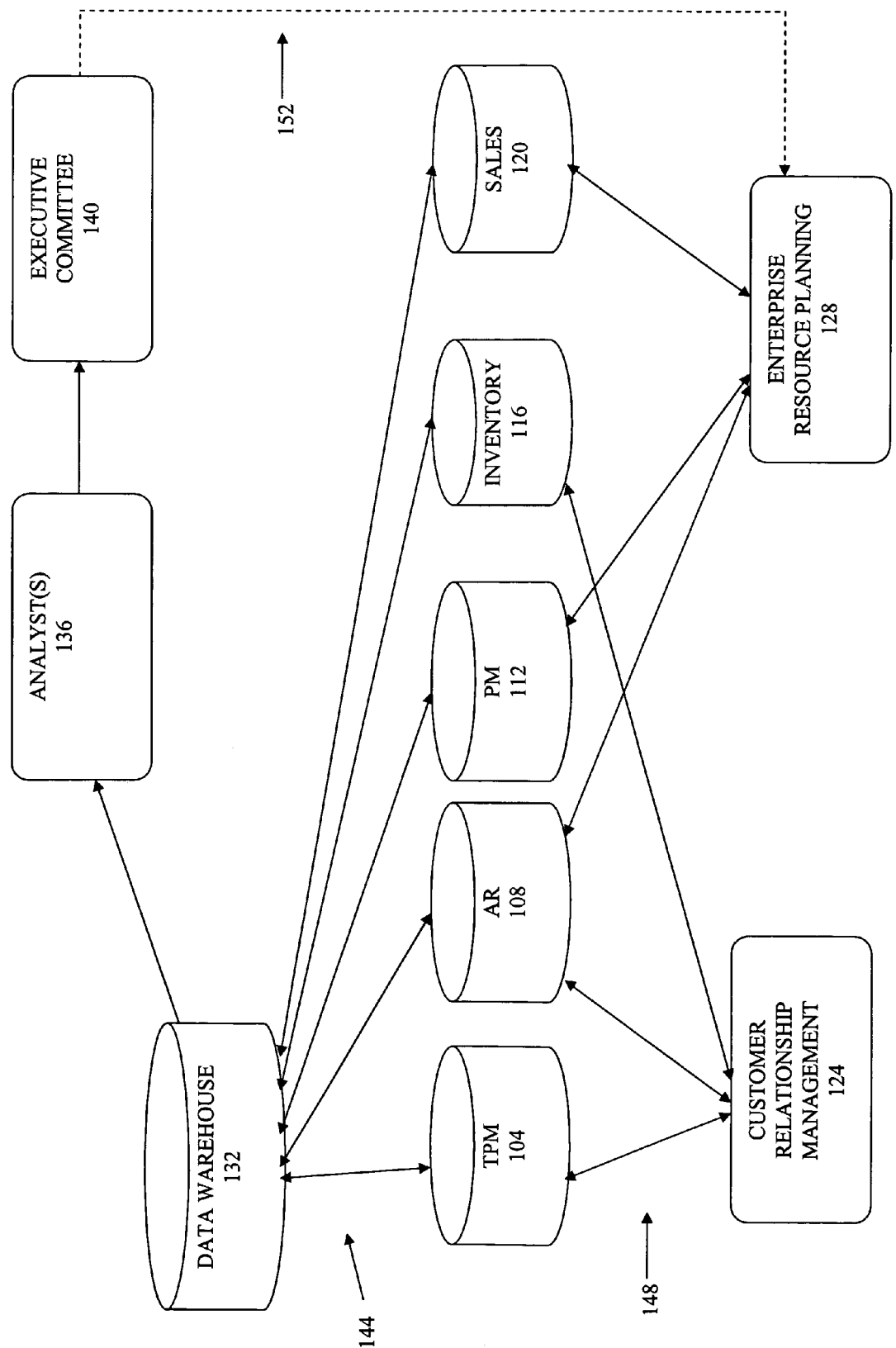
FIG. 1 is a simplified graphical representation of an enterprise pricing environment.
Figure 2:
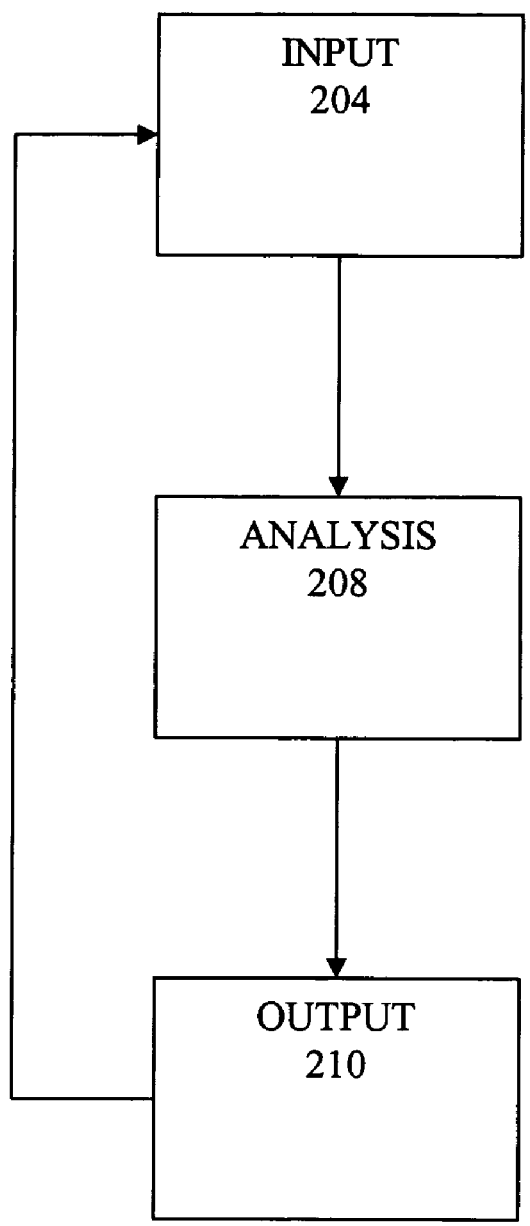
FIG. 2 is a simplified graphical representation of a closed-loop system.

FIG. 2 is a simplified graphical representation of a closed-loop system. As can be appreciated closed-loop systems are common in, for example, business methods and software algorithms. In general, a closed-loop system is a control system in which the output is continuously modified by feedback from the environment. As illustrated, for example, an input at a step 204 would be a feedback element. Inputs may be any desired indicator or metric that is measurable in some way. For example, an input may be the volume of product specified in a sales proposal. The input is then analyzed at a step 208. Many types of analysis are available depending on the intended use. A simple comparison of the volume of product against available inventory of that product is one example. Another example might include advanced statistical analysis where appropriate. Thus, as can be appreciated, analysis in a closed-loop system may be highly complex.

An output is generated next at a step 210 based on the analysis of step 208. An output may be any operation that is intended to affect a condition of the desired system. In the above sales proposal example, a sales order for a specific volume of a specific product may be entered (e.g. input); compared against a threshold acceptable volume and price range (analysis); and affected by an approval or disapproval decision depending on the comparison (output). Finally, the system loops back to the input and continues until the system, or user terminates the process.

Figure 3:
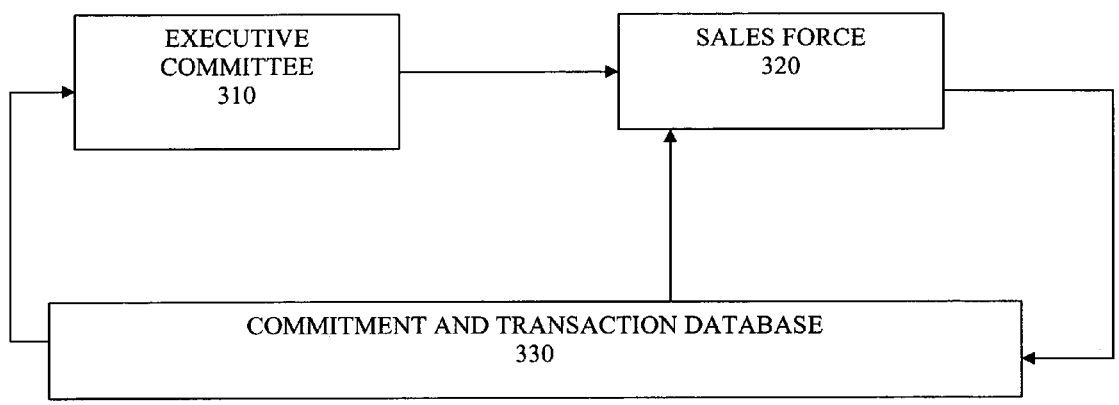
FIG. 3 is a simplified graphical representation of a closed-loop implementation of an embodiment of the present invention.

As pertains to the present invention, FIG. 3 is a simplified graphical representation of a closed-loop implementation of an embodiment of the present invention in a price modeling environment. Transaction data and commitment data are populated into a unified database. Commitment data, which includes forecast and projection data, are line item level waterfall history records. Typical commitment data include, but are not limited to, unit price, volume, SKU (Stock-Keeping Unit), customer number, effective date and expiration date. As will be illustrated herein below, numerous other commitment data are known and used in a price modeling environment. Commitment data represents sales forecasts/projections generated from various sources such as contracts, quotes and agreements from sales force 320. Contracts, deals, price lists, etc. are typically created as object items which are then converted to a single normalized form so that they can be compared and correlated with transaction data. Accordingly, as contracts, quotes and the like are generated and subsequently converted, commitment data populate the database 330. For example, a typical commitment may be a proposal to sell 20,000 units of product X having a SKU of XXYY at the price of $5.00 per unit, with the order to be completed within 60 days of the order date. As each commitment is generated, a unique identifier, VID, identifying that commitment, is also generated and stored with that commitment.

Transaction data are also line item waterfall records. Each transaction represents a historical record of actual shipment of specific product to a specific customer of specific volume for a specific price on a specific date. Transaction data are typically generated in order processing systems such as SAP or Oracle. As such, transaction data are typically imported into database 330 via ETL (Extraction, Transformation, Loading) tools, as known by those skilled in the art.

As previously discussed, a warehouse of such waterfall records without any correlation results in a voluminous amount of "unreadable" raw data. Accordingly, correlation of transaction data and commitment data (which will be discussed herein below) and the resulting analysis/comparison thereof enable decision makers, such as executive committees, to set and revise global pricing policies, thereby enabling sales personnel to make pricing decisions and negotiate deals and provide proposals based on actual customer order data. In a simplified example, customer A places an order for 10,000 units of product X, at a certain unit price, to be fulfilled by a certain date. A decision maker, e.g. policy maker or sales person, can now determine if customer A in fact placed orders for all 10,000 units at the specified price and make pricing decisions for subsequent commitments for customer A based on the results of that analysis. Depending on the results of such analysis, organizations can set pricing policies, discount policies, rebate programs, etc.

Additionally, unified database 330 enables decision makers to directly access, analyze and gain other complex intelligence such as the average amount of discretionary sales discount offered for a specific product on successful quotes when Z is the primary competitor, quote-to-order conversion ratio for a specific product family at a given discount, how a specific customer performed against its commitments for a specific year when it was given a series of volume breaks for a specific product, etc. Accordingly, such business intelligence enables policy and pricing decision makers to make better-informed decisions in a timely manner.

As sales force 320 generates new proposals and agreements based on unified database intelligence, new commitments are generated, thereby further populating the commitment portion of unified database 330, which closes the loop. Accordingly, the unified database is a continuum of waterfall records enabling pricing policies to be updated as new commitments or transactions are entered, or at the very least on a periodic basis.

As can be appreciated, the unified database will typically contain millions of data records. Therefore, to facilitate the processing speed required for a real-time analysis of such volume of data, the unified database is preferably stored in random access memory (RAM). Alternatively, the unified database my also be stored on a disk, thereby increasing storage capacity for less-interactive type of analysis such as management reporting. It is understood that the two storage mediums may be used exclusively or in conjunction, depending on user application and preference.

Figure 4:
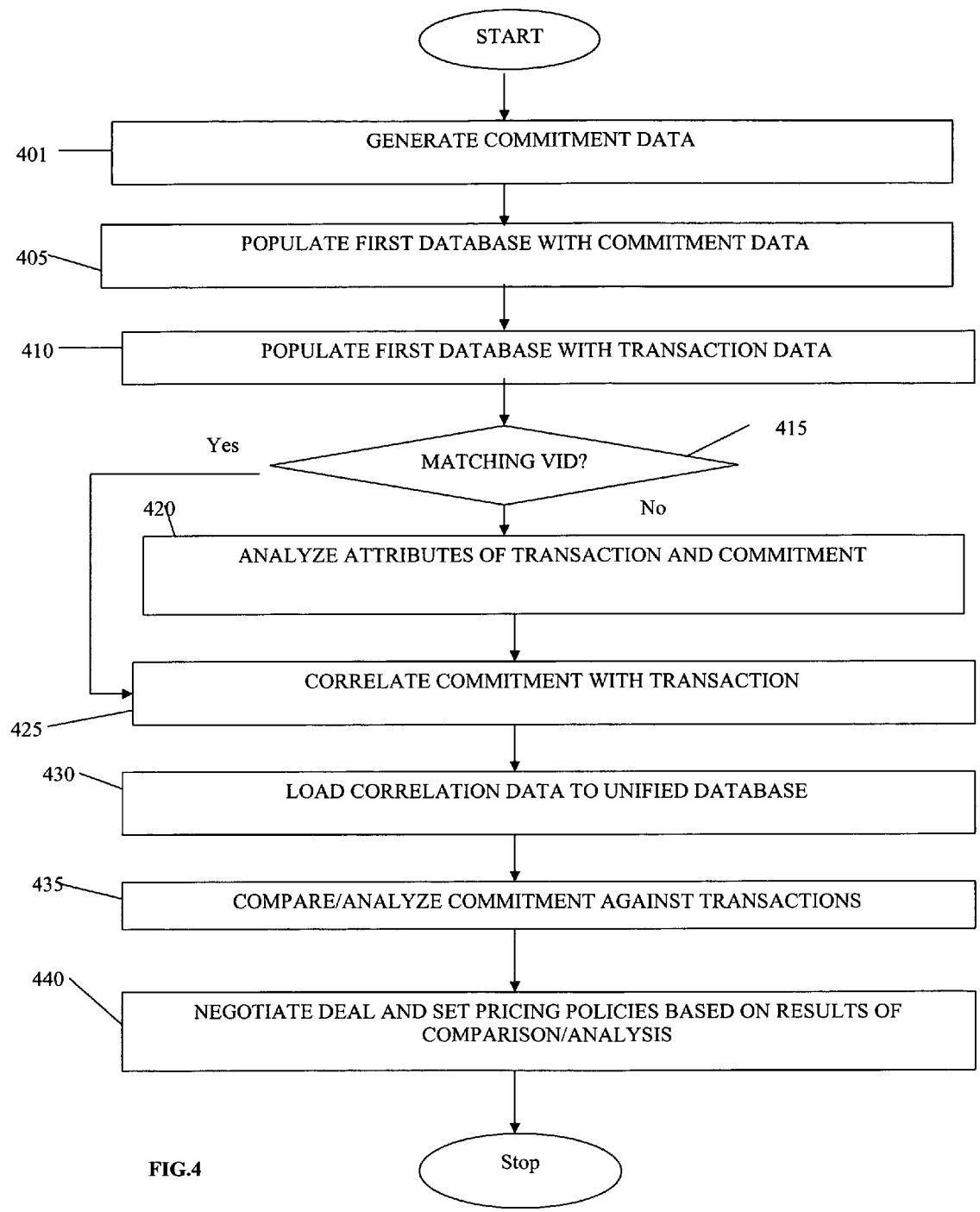
FIG. 4 is a flowchart representing an embodiment of the present invention based on a closed-loop system.

An example embodiment of the present invention using a closed-loop system is presented in FIG. 4. At a first step 401, commitment data are generated by converting deals, e.g. sales quotes, proposals, agreements, etc., from object form into a single normalized form. Preferably, the conversion process is driven though a mapping file defined by the user. The conversion process enables not only the creation of commitments but also enables the correlation with transactions.

At step 405, commitment data is then populated into the first database.

At step 410, transaction data are populated into the first database. As mentioned, transaction data are typically generated in systems different from those that generate commitments and therefore imported into the first database via ETL (Extraction Transformation and Loading) tools and may not have VID.

At step 415, commitments and transactions are correlated in either of two methods. Before discussing the correlation methods, certain assumptions and characteristics of transaction and commitments should be understood. First, each transaction correlates to, at most, one commitment. Second, each commitment may correlate to zero, one or more transactions. For example, a commitment by customer A to purchase 10,000 units of product X for a specific price to be fulfilled by a specific date, will have zero transactions if that commitment has not been fulfilled. Alternatively, that same commitment may have one or more transactions, depending on how many orders were placed against that commitment by that customer. In the corollary, all such transactions correlate to the same commitment, since the transactions resulted from the single commitment.

Accordingly, step 415 initially looks to match commitment and transaction(s) having the same VID. When VID matching is not possible, since transaction data are typically imported via ETL tools, step 420 analyzes other attributes of the commitment and transaction data. For example, step 420 may rely on respective SKU, Sold to, Ship To, Salesperson, Ship Date, etc. information to correlate commitment and transactions. The actual number of attributes analyzed under step 420 and the number of matching attributes needed for an acceptable correlation will depend on user requirements and specification.

Once transaction and commitment data are correlated, step 430 loads the data into unified database for analysis and comparison.

Figure 5A:
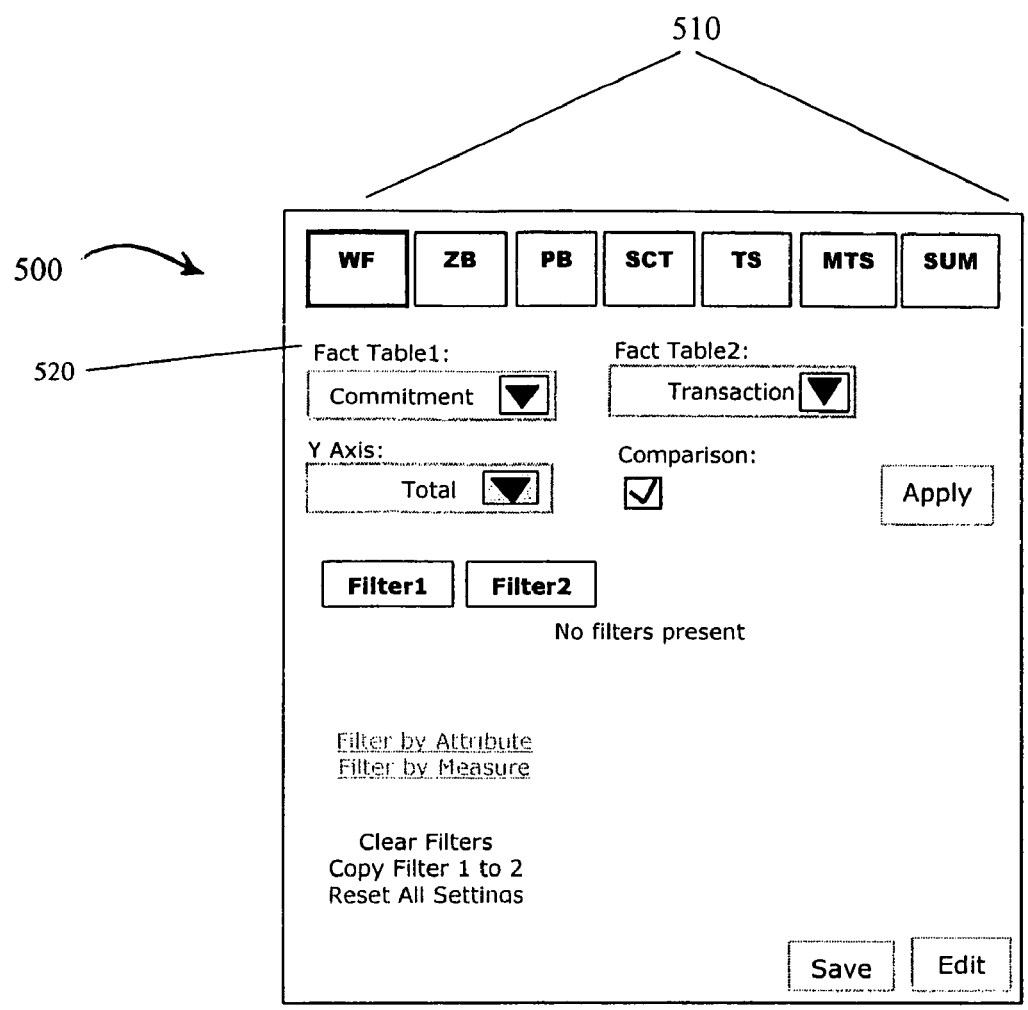
FIGS. 5A and 5B are exemplary user control panels in accordance with an embodiment of the present invention.

At step 435, the correlated transactions and commitments in the unified database information may be accessed and analyzed using an electronic control panel such as that illustrated in FIG. 5A, enabling decision makers to compare, contrast, manipulate and analyze the information. The results of the parameters chosen by a user in the control panel are displayed in a user interface such as that shown in FIG. 7.

At step 440 the results of analysis of the correlated data enables policy makers to set new pricing policies and sales personnel to negotiate and generate new deals using the intelligence and guidance set forth by analysis of the unified database. For example, a sales person may want to determine if certain discounts given to certain customer resulted in actual orders being placed and whether the commitment was fulfilled before presenting such discounts in a proposal. Additionally, a policy maker may want to eliminate certain rebates if it is determined that previous rebate programs did not improve sales of a particular product line.

Figure 5B:
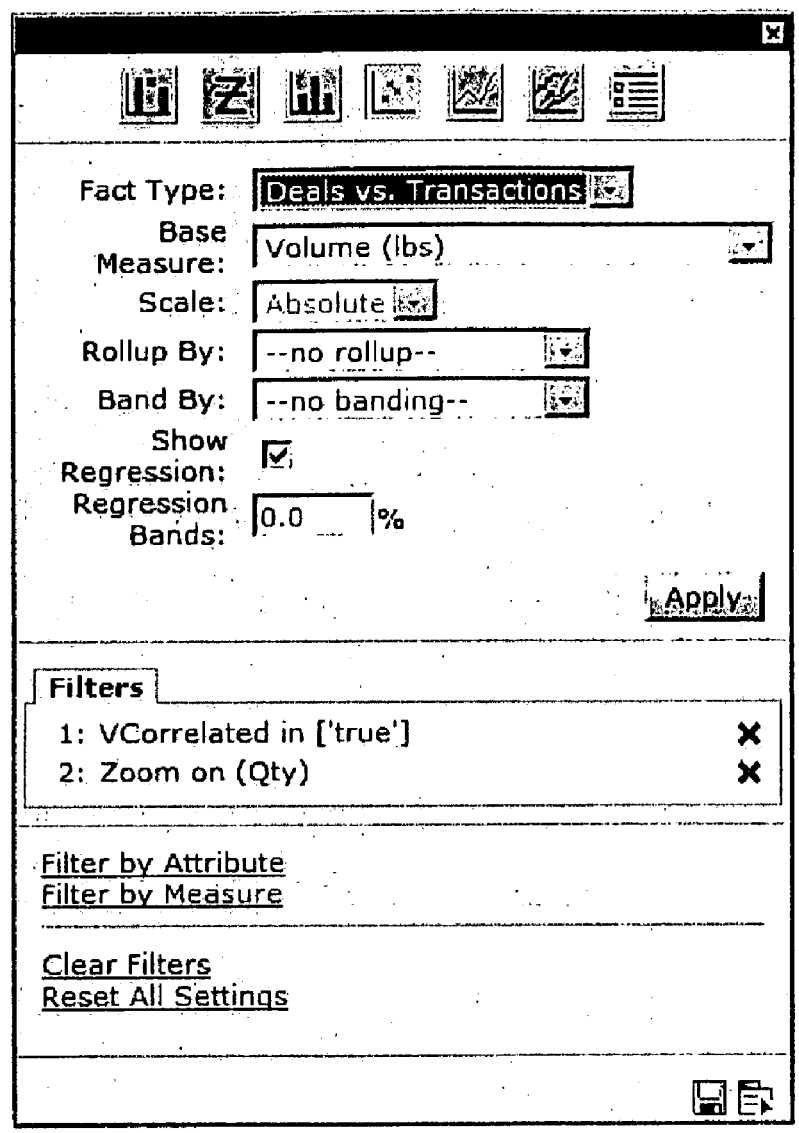

FIGS. 5A and 5B are exemplary electronic control panels in accordance with an embodiment of the present invention. An electronic control panel 500 may be graphically displayed as illustrated. Various reports may be generated, through user selection choices 510. In the illustration shown, a waterfall chart (WF) has been selected. In this waterfall report, the user may compare and contrast commitment and actual transaction data, and view the progression or change over time. The user has the option of choosing any combination of fact tables 520, which in waterfall chart (WF) has a drop down list of two choices, commitments and transactions. Thus, the user may compare commitments and transactions or transactions with other transactions or commitments with other commitments. The user also has the ability to define business metrics of KPI (Key Performance Indicators) that compare commitment/projection/forecasts vs. actual. For example, a success rate that is defined as the percentage of forecasts turned into actual sales can be used to guide the management in determining pricing and sales policy.

Other charts may have other drop down options under the fact table fields as well as other fields and filters. The fields so illustrated are not intended to be limiting in any way. The user may also activate filters to isolate e.g., certain attributes of the waterfall records.

Figure 6:
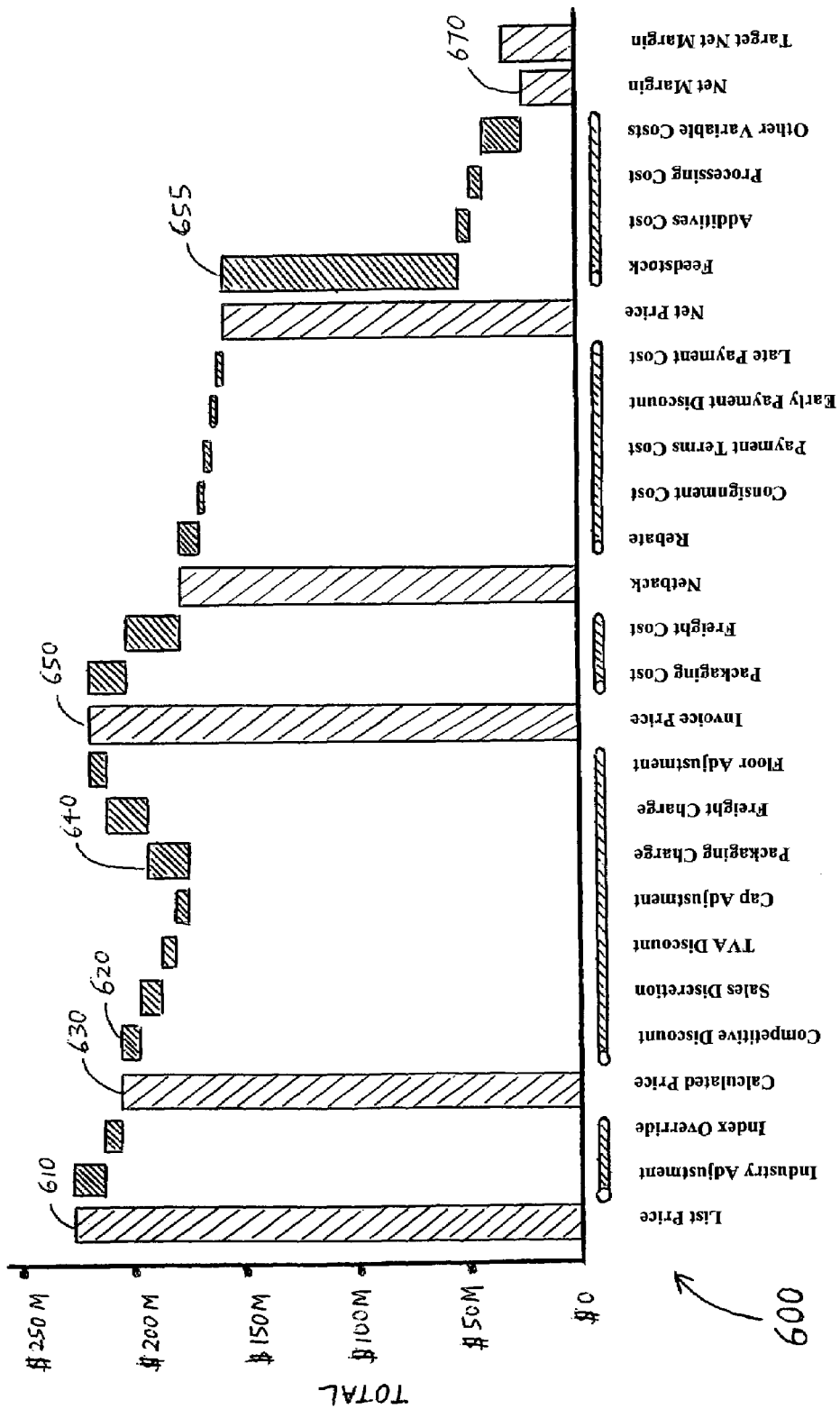
FIG. 6 is an example user interface in accordance with an embodiment of the present invention.

FIG. 6 illustrates a user interface in accordance with an embodiment of the present invention. FIG. 6 shows an example of a time continuum waterfall report, as selected with the control panel of FIG. 5A. In this waterfall report 600, the cumulative transactions for a typical product family are shown over a certain time period. For example, the time period may be the life of the product family. Alternatively the time period may be the current fiscal year. As shown, various price adjustments and charges are made through the continuum of life cycle. For example, at the very left hand side of the report, represents the initial stage of the time continuum. As such, List Price 610 represents, for example, the price quoted in sales proposals and quotes. At the other end of the time continuum spectrum, Net Margin 670 represents the net profit after all charges and adjustments throughout the time continuum have been taken. In this report 600, charges are added to the most previous line item and adjustments or discounts are subtracted from the most previous line item. For example, Competitive Discount 620 is subtracted from Calculated Price 630 while Packaging Charge 640 is added to Cap adjustment. As can be seen, waterfall report 600 enables one to clearly see the difference between List Price 610 and Invoice Price 650 and the net effect the various adjustments and charges made. Through analysis of waterfall chart 600, a decision maker may, for example, see that Feedstock Cost 655 clearly had the biggest negative impact on Net Margin 670. With that type of intelligence, a decision maker, or anyone studying the chart 600, may examine Feedstock Cost more closely to determine, for example, if Feedstock Cost is just as significant for other products and or through other time periods.

Depending on user selected parameters in the control panel 500, a waterfall chart may be generated for a single product, multiple products and over any time period. Additionally, the line items shown in FIG. 6 are not intended to be limiting in any way.

Figure 7:
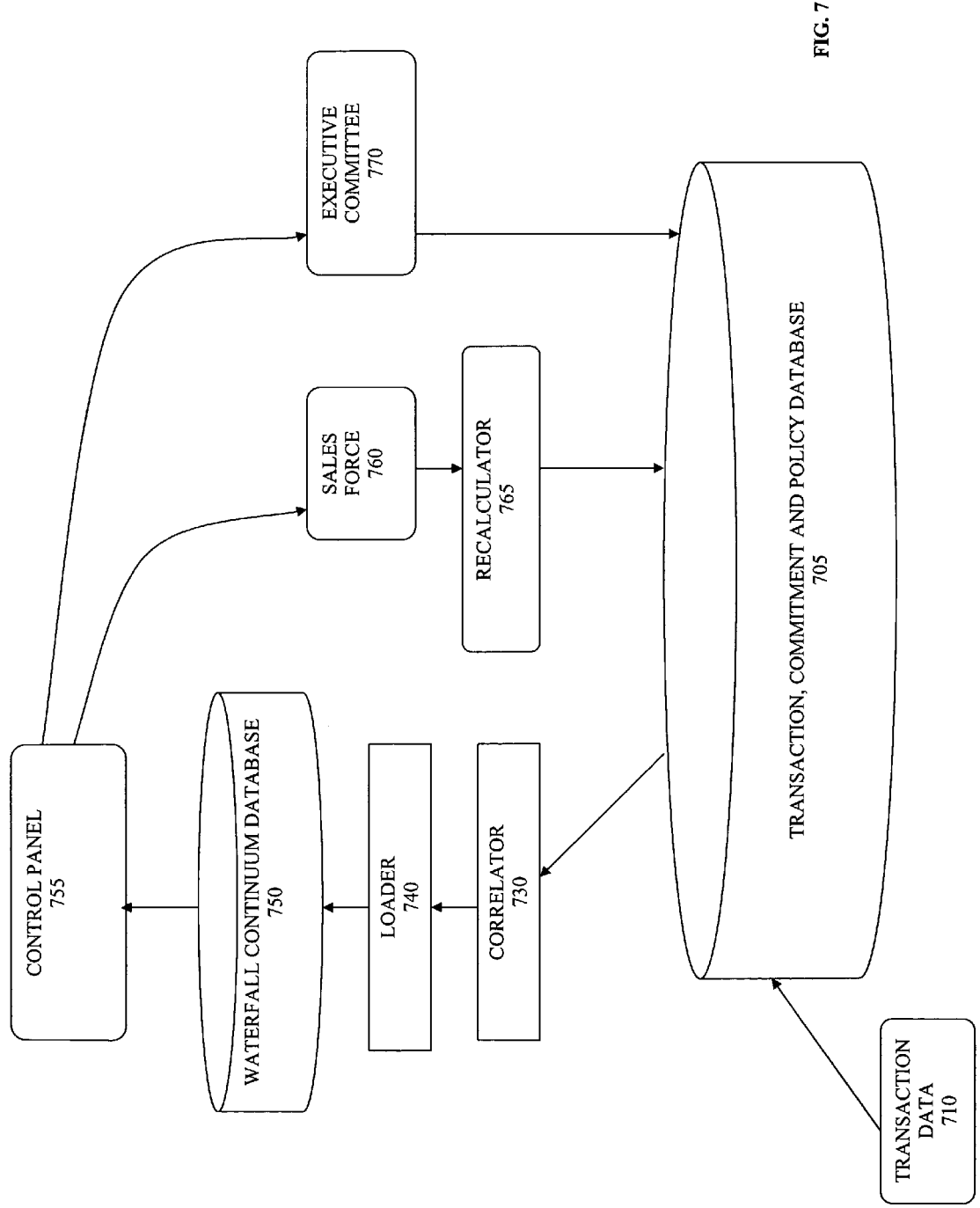
FIG. 7 is a simplified graphical representation of a closed-loop implementation of an embodiment of the present invention.

Another example embodiment of the present invention using a closed-loop system is presented in FIG. 7. As shown in FIG. 7, database 705 contains commitment/projection/forecast data, transaction data and policies. Transaction data 710 generated as actual orders are placed and are imported from an external source via ETL tools. Commitment data are generated as sales orders and proposals are generated by sales force 760 and converted into commitment data by Recalculator engine 765. Recalculator engine 765 converts sales quotes, proposals, etc. from object form to single normalized form enabling correlation with transaction data. Preferably, the conversion process is driven through a mapping field defined by the user. Recalculator engine 765 also recalculates, updates and deletes commitment data as e.g. pricing policies change or new deals are generated.

A correlator module 730 then correlates the commitments with the actual transactions using either VID matching or matching of certain waterfall attributes, as described herein above. After correlation is completed a loader module 740 loads the correlated data into a waterfall continuum database 750, unifying data from the various systems that represent different slices of pricing information in the time continuum or life cycle. Control panel 755 enables sales force 760 and executive committee 770 to compare, contrast and analyze the unified database. As sales force 760 generates new proposals and quotes, new commitments are generated and populated into database 705 to close the loop. Likewise, as executive committee 770 adopts new pricing policies, those policies get populated into the database 705 as well.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention.

It is therefore intended that the following appended claims be interpreted as including all such alterations, modifications, permutations, and substitute equivalents as fall within the true spirit and scope of the present invention.

What is claimed is:

1. A method of making a pricing decision in a price management system comprising:
    generating commitment data by converting commitments in an object form into commitment data in a single normalized form, and wherein the conversion uses a user-defined mapping file;
    populating a historical database with commitment data and transaction data;
    correlating each commitment data with a corresponding transaction data to generate correlation data;
    populating a unified database with correlation data;
    analyzing the unified database; and
    wherein pricing decisions are made based on analysis of the unified database.

2. The method of claim 1 wherein commitment data and transaction data are correlated based on corresponding unique identifiers.

3. The method of claim 1 wherein commitment data and transaction data are correlated based on analysis of at least one attribute from each data.

4. The method of claim 1 wherein the unified database is stored in random access memory (RAM).

5. The method of claim 1 wherein the analyzing of the unified database includes defining business metrics of Key Performance Indicators including a success rate based on a comparison of actual sales against forecasted sales.

6. The method of claim 1 wherein the analyzing of the unified database includes filters for isolating selected attributes associated with the commitment data or the transaction data.

7. A system for making pricing decisions in a price management system comprising:
    a recalculator engine for generating commitment data by converting commitments in an object form into commitment data in a single normalized form, and wherein the conversion uses a user-defined mapping file;
    a unified database containing correlation data that correlates commitment data with transaction data;
    a user interface for displaying and analyzing the unified database; and
    wherein pricing decisions are made based on the analysis of the unified database.

8. The system of claim 7 further comprising:
    a historical database populated with commitment data and transaction data; and
    a correlation module for correlating the commitment data with the transaction data.

9. The system of claim 7 wherein the unified database is stored in memory.

10. A computer program product in a computer readable media for making pricing decisions in a price management system comprising:
    a recalculator engine for generating commitment data by converting commitments in an object form into commitment data in a single normalized form, and wherein the conversion uses a user-defined mapping file;
    a unified database containing correlation data that correlates commitment data with transaction data;
    a display for displaying and analyzing the unified database; and
    wherein pricing decisions are made based on the analysis of the unified database.

11. The computer program of claim 9 further comprising:
    a historical database populated with commitment data and transaction data; and
    a correlation module for correlating the commitment data with the transaction data.

* * * * *